United States Patent

[11] 3,633,015

[72] Inventor Francis F. Lee
35 Highland Ave., Box D, Lexington, Mass.

[21] Appl. No. 17,736
[22] Filed Mar. 9, 1970
[45] Patented Jan. 4, 1972

[54] ADJUSTABLE CYCLE LENGTH PSEUDORANDOM SEQUENCE GENERATOR
16 Claims, 3 Drawing Figs.

[52] U.S. Cl. .......... 235/152, 331/78
[51] Int. Cl. .......... G06f 1/00
[50] Field of Search .......... 235/152; 331/78; 179/15 BY; 328/59, 61

[56] References Cited

UNITED STATES PATENTS

| | | | |
|---|---|---|---|
| 3,445,591 | 5/1969 | Koehler et al. .......... | 331/78 X |
| 3,521,185 | 7/1970 | Ley .......... | 331/78 |

OTHER REFERENCES

S. W. Golomb, " Digital Communications with Space Applications" 1964 pp. 7–32

C. Kramer A Low-Frequency Pseudo-Random Noise Generator " Electronic Engineering" July 1965 pp. 465–467

M. G. Hartley Development, Design and Test Procedures for Random Generation Using Chaincodes "Proc. IEE," Vol. 116, No. 1 Jan. 1969 pp. 22–26

M. G. Hartley Evaluation of Performance of Random Generators Employing Chaincodes " Proc. IEE," Vol. 116 No. 1 Jan. 1969 pp. 27–34

*Primary Examiner*—Malcolm A. Morrison
*Assistant Examiner*—David H. Malzahn
*Attorney*—Cesari and McKenna

ABSTRACT: A random sequence generator has a cycle length which can be set externally to any desired value ranging from a single bit to the full-cycle length of the generator.

Figure 1:
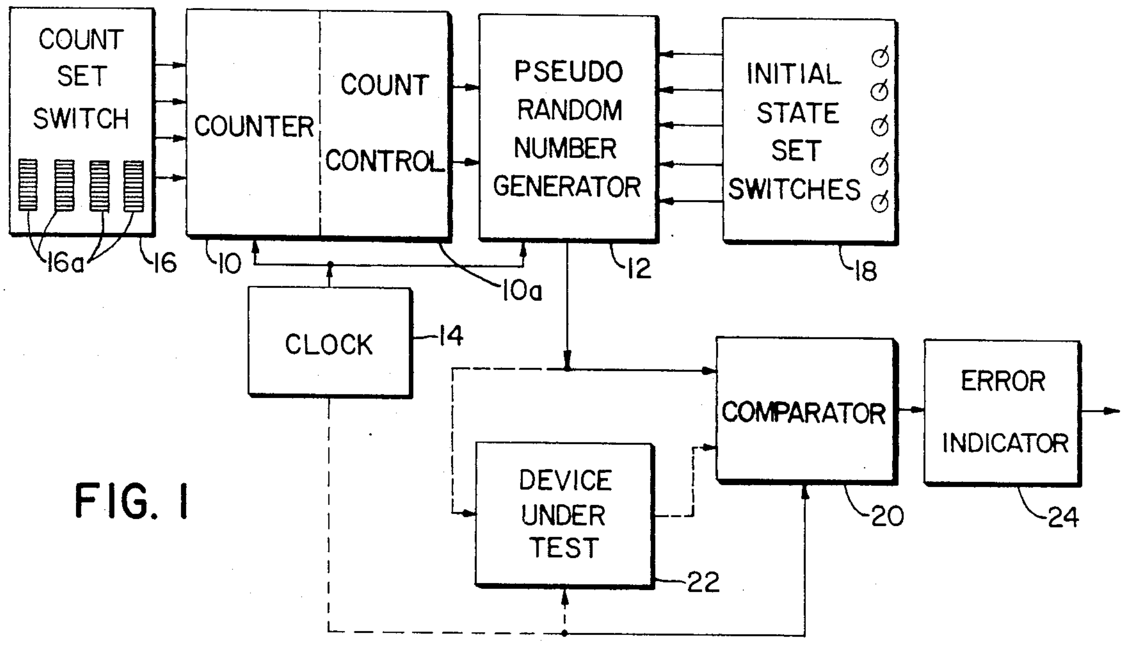

INVENTOR
FRANCIS F. LEE
BY
Cesari and Mc Kenna
ATTORNEYS

INVENTOR
FRANCIS F. LEE
BY
Cesari and McKenna
ATTORNEYS

ADJUSTABLE CYCLE LENGTH PSEUDORANDOM SEQUENCE GENERATOR

BACKGROUND OF THE INVENTION

1 Field of the Invention

The invention relates to a random sequence generator and more particularly to a random sequence generator having a continuously adjustable cycle length.

2. Prior Art

A random sequence generator provides a random digit sequence which can be used to advantage in testing a variety of devices such as information transmission devices, data processing devices, computer memories, etc. The generators of interest here are actually pseudorandom in nature, as opposed to purely random, since the generated sequence is repeated after a finite number of digits (the cycle length).

To meet the needs of varying devices to be tested, it is desirable to generate pseudorandom sequences of any desired length. Heretofore, sequences of a given length have been formed by sensing the state of the random sequence generator and terminating the output string when a generator state corresponding to the desired cycle length is reached. For each such state, suitable logic circuitry must be provided to perform the necessary sensing operation. Further, a time-consuming calculation must be performed in order to determine the exact state of the generator corresponding to the desired cycle length in order that the logic circuitry may be constructed to sense the appropriate state. When a large number of sequences of different lengths are to be provided, the additional logic circuitry becomes unduly expensive and the required calculations can be quite time consuming. For this reason, present random number generators contain provisions for only a limited number of different cycle lengths.

SUMMARY OF THE PRESENT INVENTION

Objects

Accordingly, it is an object of the present invention to provide an improved pseudorandom sequence generator.

Another object of the present invention is to provide a pseudorandom sequence generator having an adjustable cycle length.

A further object of the invention is to provide a pseudorandom sequence generator which has an adjustable cycle length and which is economical to construct and simple to operate.

Still a further object of the invention is to provide a pseudorandom sequence generator whose cycle length can easily be set to any usable value within a predetermined range of values.

Brief Description of the Invention

In accordance with the present invention, a pseudorandom sequence generator of fixed cycle length is controlled by a settable counter which counts through any count within its counting range for which it has been set. The generator and the counter operate in synchronism with a clock; as long as the count is less than the desired count the generator provides a continuous pseudorandom sequence of binary digits in response to clock pulses. When the count advances to the desired count, the sequence is terminated, the generator is set to a predetermined initial state, and a new sequence is initiated. In this manner, the generator continues to repeat a pseudorandom sequence of any desired length corresponding to the setting of the counter.

I have also provided an arrangement for extending the maximum cycle length beyond the nominal counting range of the counter in order to utilize the counter capacity to fullest advantage.

DESCRIPTION OF THE INVENTION

Figure 3:
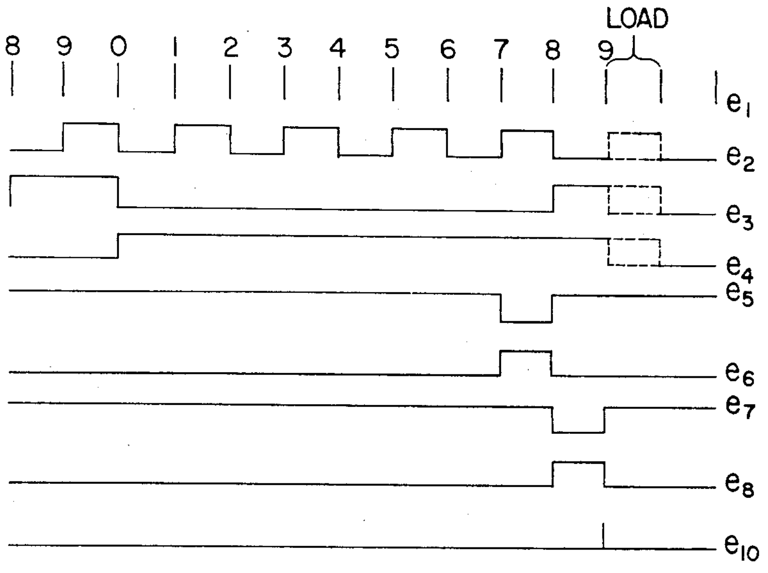
Figure 2:
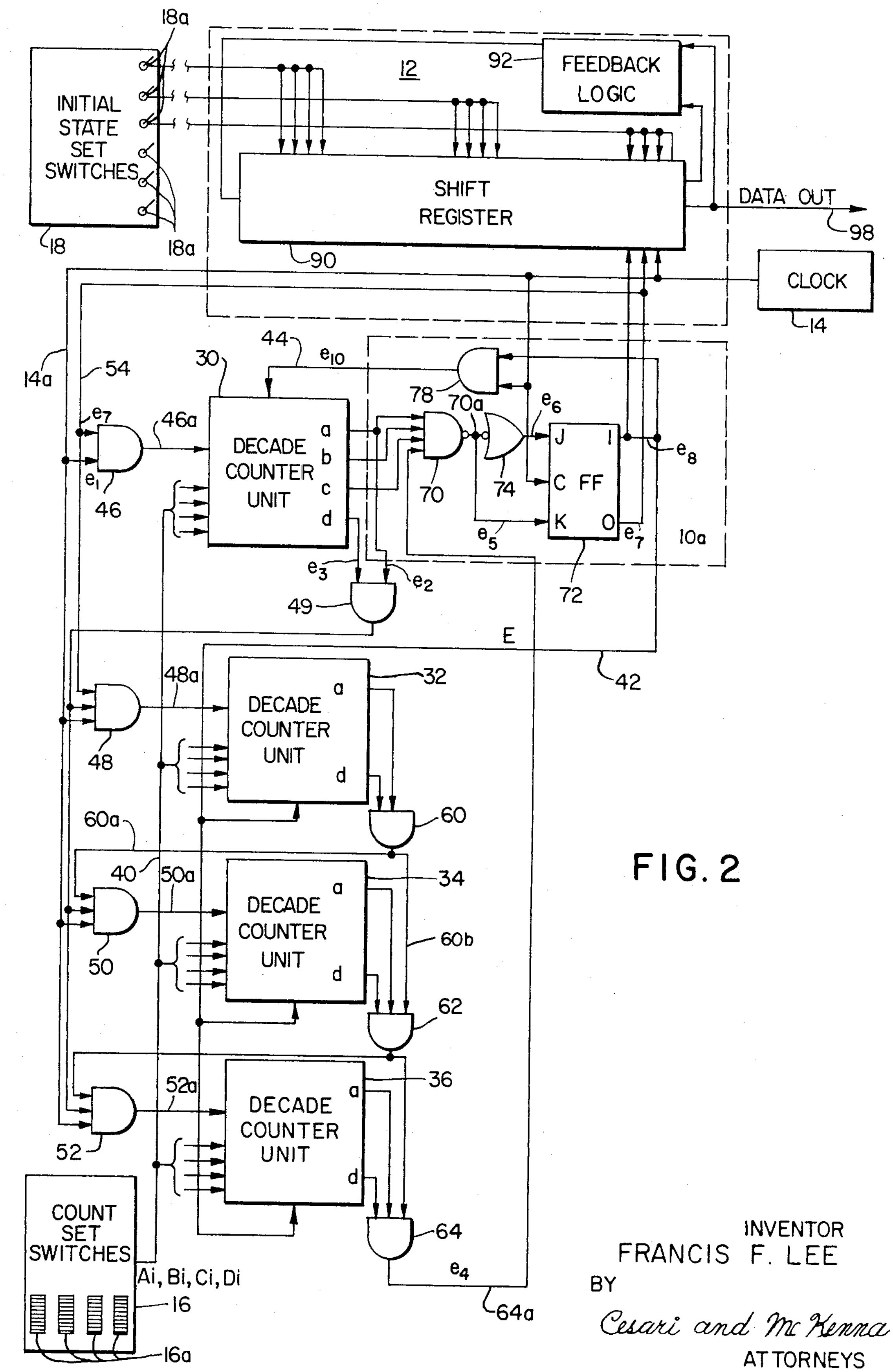

The foregoing and other and further objects and features of the invention will be more readily understood by references to the following drawings in which FIG. 1 is a block diagram of a pseudorandom sequence generator constructed in accordance with the present invention and connected to a serial storage device for testing the latter;

FIG. 2 is a more detailed schematic diagram of the counter and generator circuitry of FIG. 1; and FIG. 3 is a timing diagram for the circuitry of FIG. 2.

In the following description, I use the convention that quantities are considered to be "true," "present," or at their "assertion" level when at a "high" value and are considered to be "false," "absent," or at their "negation" level when at a "low" value.

Referring now to FIG. 1, a counter 10 and a pseudorandom sequence generator 12 are supplied with clock pulses from a clock 14. The counter 10 counts, in response to pulses from the clock 14, to a count determined by the setting of count set switches 16*a* in a switch unit 16 and supplies control signals indicative of the instantaneous count to the generator 12 through a count control unit 10*a* which forms part of counter 10. The initial state of the generator is set by a switch unit 18. The generator 12 generates a pseudorandom sequence which it supplies to a comparator 20, as well as to device 22, external to the generator, whose characteristics are to be tested. The device 22 forms no part of my invention and accordingly connections to it are shown in dotted lines only.

The operation of the device 22 is synchronized with the operation of the generator through the clock 14. For purposes of illustration, it is assumed that the storage capacity of the device 22 is exactly equal to the selected cycle length so that its output is synchronized with the output of the pseudorandom sequence generator 12 after the first cycle. The output of the device 22 is applied to the comparator 20 in synchronism with the output of the generator 12 and is compared bit-by-bit with the pseudorandom sequence applied by the generator. When each bit in the two numbers is the same, the device 22 is operating properly and is properly regenerating the number fed to it at an earlier time by the generator 12; accordingly, the comparator output remains inactive. If the device 22 fails to generate the desired replica of its input, the comparator 20 provides a signal to an error indicator 24 on detecting a disparity in any bit in the sequence.

FIG. 2 is a schematic drawing showing the counter 10, and control unit 10*a* and the generator 12 in greater detail, while FIG. 3 is a timing diagram which will assist in understanding the operating sequence in FIG. 2. In FIG. 2, the counter 10 comprises a number of decade counter units 30–36. In the embodiment illustrated, each counter unit comprises a 4-bit binary counter providing outputs of weight 1, 2, 4 and 8 units, respectively, on output terminals 30*a–d*, 32*a–d*, etc., respectively. Each counter unit has internal feedback connections to cause it to count on a scale of 10. The unit 30 corresponds to the lowest order digit, i.e., the "units" digits, while the units 32–36 correspond, respectively, to the "tens," "hundreds," etc. digits. The initial state of each unit 30–36 is set from the switch unit 16 via lines 40 on receipt of an appropriate reset pulse from the control unit 10*a;* the reset pulses are supplied over a lead 42 in the case of counter units 32–36 and over a lead 44 in the case of counter unit 30. The count in each unit is advanced one count at a time by clock pulses applied to the counter units over leads 46*a*–52*a* from AND-gates 46–52, respectively.

The switches 16*a* in switch unit 16 are manually settable so that the cycle length to be generated by the generator 12 can be selected. In response to the switch settings, the counter units 30–36 are set to the complement of the switch settings on receipt of a "reset" pulse. When the counter units 30–36 are decade counters, the switches 16*a* are calibrated in terms of "units," "tens," etc., respectively, and the counters are loaded with the "9"s complements of these switch settings at the appropriate times. Thus, if it is desired to generate a cycle length of four bits, the "units" switch is set to "4" and the remaining switches are left at "0" ; on receipt of the "reset" pulse, the counter 30 is reset to the "9"s complement of 4, that is, it is reset to 5 and the remaining counter units are reset to 9. Then on receipt of successive clock pulses, the counter 30 cycles through the counting states 6, 7 and 8. For reasons described below, it is reset during the time corresponding to the ninth counting state, but an output corresponding to this state is nevertheless generated as described hereafter so that the counter unit counts through a count of four. The counter units 32–36 operate in similar fashion except that they count fully through the "nine" count state before reset.

Gates 46–52 control the application of timing pulses $e_1$ from the clock 14 to the counter units 30–36. Gate 46 is enabled by timing pulses from the clock 14 over lead 14*a* and by control signal $e_7$ from the count control unit 10*a* over a lead 54. Gate 48 is enabled by coincidence of the signals $e_1$ and $e_7$ from the clock 14 and the control unit 10*a*, respectively, and additionally by a signal from the immediately preceding counter 30 when that counter has advanced to the "9" state. The remaining gates, i.e., gates 50, 52 and any gates which may be inserted therebetween, are enabled by coincidence of a signal $e_1$ from the clock 14, a signal from the counter unit 30, and a signal from the counter unit immediately preceding the gate in question when the counter unit reaches the "9" state. The "9" state of counter unit 30 is detected by AND-gate 49; the "9" state of counter units 32–36 is detected by AND-gates 60–64, respectively. The output of gate 60 is applied via a lead 60*a* to gate 50 on the input side of counter unit 34 and is also applied via a lead 62*b* to gate 62 on the output side of counter unit 34. Similarly, the output of gate 62 is applied to both the input and output gate circuits of the next following counter. The output $e_4$ of the gate 64 is applied via a lead 64*a* to the control unit 10*a*.

The arrangement so far described ensures that the counter units 30–36 operate in the proper sequence to generate the appropriate count. As each counter unit advances to the "9" state, it energizes the input circuitry of the next counter unit in sequence so that the latter counter count may be advanced one unit on the occurrence of the next timing pulse. It also energized the output gates of the next counter unit in sequence whenever all decade units preceding it are set to "9" ; thus, the count is properly advanced through the counter units.

As noted above, the output of gate 64 is applied to control unit 10*a* and, more specifically, to a gate 70 in the unit 10*a;* this occurs when each of the units 32–36 contains a "9." The gate 70 is an inverted output AND gate which is enabled by the "1," "2," and "4" outputs (corresponding to a count of 7) of the decade counter unit 30 as well as by the output of the gate 64. When all its inputs are "present" or "high," thus indicating that the counter is in the 99....97 count state, its output $e_5$ on the lead 70*a* is at a "low" value. The output of the gate 70 is applied directly to the "K" input of a flip-flop 72 and is applied through an inverter 74 to the "J" input of this flip-flop as signal $e_6$. The flip-flop 72 is a conventional "J–K" flip-flop which, on the occurrence of a timing signal applied to the "C" input terminal, supplies an output on its "1" output terminal when an input is applied only to the "J" input terminal; supplies an output on the "0" output terminal when an input is applied only to the "K" input terminal; "complements" or changes its state when inputs are applied simultaneously to the "J" and "K" input terminals; and remains undisturbed when no inputs are applied to either the "J" or "K" input terminals. Thus, prior to the time that the counter 10 reaches the 99...97 counting state, the gate 70 remains closed, the output on the lead 70*a* is "high" and the flip-flop 72 remains in the "0" state, that is, the "0" output ($e_7$) is "-high" and the "1" ($e_8$) output is "low."

The "1" and "0" outputs of flip-flop 72 are applied as control signals to the pseudorandom sequence generator 12 which is described in detail below. The "1" output of flip-flop 72 is connected as an input to an AND-gate 78 which receives a second input from the clock 14 to reset counter unit 30 via lead 44.

When the counter advances to 99....97 and the output of gate 70 goes "low," the "J" input of flip-flop 72 is energized. On occurrence of the next clock pulse, the counter advances to the 99....98 state. This resets counter units 32–36 through signal $e_8$; further, it resets counter unit 30 through gate 78 on receipt of the next timing pulse from clock 14. Since the state of the signals $e_2$, $e_3$, and $e_4$ immediately after reset depends on what is loaded into their associated counters, these signals are shown in dashed-line form during the "load" time interval.

Turning now to the pseudorandom sequence generator 12 in FIG. 2, this generator may advantageously be formed from a conventional *n*-bit shift register 90 having a logic circuit 92 connected in feedback relation around it. The register 90 receives control inputs from the clock 14 and from the "1" and "0" outputs of the flip-flop 72; additionally, it receives "initial-state" condition signals from the switches 18*a* of switch unit 18. The clock pulses shift the contents of the register one bit to the right during each clock pulse interval as long as the "0" output of flip-flop 72 is "high" and load the number determined by the switches 18*a* into the register when the "1" output of flip-flop 72 goes "high." The feedback logic circuit 92 operates on selected bits in the shift register 90 in a manner known to those skilled in the art and provides an input to the leftmost stage of this register which depends on the state of the rightmost bits. For example, with a shift register 90 of 15 stages, the circuit 92 may comprise an exclusive OR circuit which provides an input to the register 90 only if one, but not both, of the rightmost bits is a "0." Switches 18*a* allow the operator to select a desired starting sequence of a length equal to the length of the shift register 90 to begin the data output. When the length of the selected sequence is less than or equal to the length of the starting sequence, only the starting sequence, or a portion of it, is repeated for each cycle. On the other hand, when the length of the selected sequence is greater than that of the starting sequence, the data output consists of the starting sequence followed by a pseudorandom sequence.

Prior to the time that the counter 10 has reached the 99....98 state, the flip-flop 72 is in the "0" state and the shift register units 90–94 respond to the clock pulses by shifting their contents one bit to the right during each clock pulse interval, thus providing a continuous "string" of pseudorandom digits on lead 98 for application to the device to be tested. When the counter 10 reaches the 99...98 state, the "0" output terminal of the flip-flop 72 drops to a "low" state and shifting of the register 90 is inhibited. At the same time, the "1" output terminal of the flip-flop 72 goes to the "high" state and the register 90 is prepared to receive the number set by switches 18a; this occurs on receipt of the next timing pulse, at which time the counter units 30–36 are also loaded. At the next clock pulse, the "1" output of flip-flop 72 returns to its "low" level, the "0" output of this flip-flop returns to its "high" level, the counter 10 again starts its count, and the register 90 is again prepared for shifting data in response to clock pulses.

Summarizing the foregoing, the counter 10 stops its count on arriving at the 99...98 state, and is reset, together with the generator 12, during what would normally be the 99...99 state. This fact is utilized to advantage in obtaining two extra counts per cycle so that fullest advantage is taken of the capacity of the counter.

This is more readily seen from the following: assume that the counter 10 is a four-stage decade counter connected in the usual fashion to count through the states 0000 through 9999 before recycling. Such a unit allows a maximum cycle length of 9999 bits; the settings for cycle lengths of zero and one digit, respectively, are effectively wasted, since cycle lengths of these magnitudes are meaningless. With the control circuitry arranged as shown in FIG. 2, however, setting the switch unit 16 for what would normally be a count of zero loads the "9"s complement of this number, i.e., 9999, into the counter 10. The counter then steps through the states 9999, 0000, 0001, .......9997, 9998 and then recycles, for a total count length of 10,000 that is, one more than the length normally obtainable. Similarly, setting the switch unit 16 for what would normally be a count of one loads 9999−1=9998 into the counter so that the counter steps through the states 9998, 0000,......9997, 9998 and then recycles for a total count length of 10,001, that is, two more than the length normally obtainable.

From the preceding description, it will be clear that I have provided an improved pseudorandom sequence generator having a cycle length which can be readily be set externally by an operator to any count within the entire range of the counter unit. This is accomplished quite simply and without the necessity for modifying any physical circuit connection and performing any calculations or referring to charts to determine the appropriate shift register state for a desired sequence length. Further, I have shown how to modify the counting sequence for selected counts which do not normally provide a useful pseudorandom sequence, for example, counts of zero and one, so that a useful sequence actually can be obtained even for these counts. For example, the particular embodiment shown herein utilizes the capacity of the counter and its associated setting switches to the fullest degree by providing two more useful cycle lengths than could normally be obtained.

It will be apparent to those skilled in the art that various changes may be made in the preferred embodiment illustrated herein without departing from the spirit of the invention, and it is intended that the foregoing description be taken and interpreted as illustrative only and not in a limiting sense.

Having illustrated and described a preferred embodiment of my invention, I claim:

1. In a pseudorandom sequence generator including a shift register responsive to a clock pulse for shifting data through the register, the improvement which comprises:
   A. a counter having a settable counting cycle and providing a control output on reaching a selected count.
   B. means for setting said counter to count through said selected count;
   C. means for applying clock pulses to said register; and
   D. means responsive to the counter control output for inhibiting the shifting of data through the register when said counter has counted through said selected count.

2. A pseudorandom sequence generator according to claim 1 in which the counter setting means comprises a plurality of selectable switches connected to said counter for selecting the count through which said counter is to count.

3. A pseudorandom sequence generator according to claim 1 in which said register comprises an $n$-bit feedback shift register for generating a string of pseudorandom outputs when said counter has counted through a count less than said selected count, said register terminating said string in response to said control output when said counter has counted through a count equal to said selected count.

4. A pseudorandom sequence generator according to claim 3 which includes means for setting said register to a predetermined number sequence on terminating said string.

5. A pseudorandom sequence generator having an adjustable cycle length, said generator comprising
   A. a counter having a counting cycle length which is selectable over a selected counting range and providing a control output indicative of the selected count;
   B. means for selecting the count through which said counter is to count;
   C. means responsive to the control output of said counter for generating a continuous string of pseudorandom sequences whenever the count in said counter is less than said selected value and for initiating a new string whenever said count equals said selected value, whereby the length of said string is determined by the setting of said counter; and
   D. means for applying clock pulses to said counter and to said generator to step said counter and said generator through their sequential operating states.

6. A pseudorandom sequence generator according to claim 5 in which said counter provides a count whose length is substantially continuously adjustable over the entire counting range of the counter.

7. A pseudorandom sequence generator according to claim 5 in which said counter comprises
   A. a plurality of counter units connected in series; and
   B. control means for controlling the counting cycle and comprising
      1. a timing gate connected to each counter unit for advancing the count therein on receipt of a clock pulse when said gate is energized;
      2. means for energizing the timing gate associated with a selected counter unit only when each of the preceding counter units has advanced to its maximum count;
      3. means for generating a control output in response to the state of said counter units when said units have advanced to a state corresponding to a selected count; and
      4. means for terminating said count and loading a number corresponding to said selected value into said counter after said state has been reached.

8. A pseudorandom sequence generator according to claim 7 in which the "$n$"s complement of the selected value is loaded into the counter units during the loading interval, where "$n$" is the maximum count to which each counter unit counts, and in which the count termination and loading sequence is initiated when the lowest order counter unit arrives at a counting state of $n$–1 while each of the higher order counters is in a counting state of "$n$" and is completed when said lowest order unit arrives at a counting state of "$n$."

9. A pseudorandom sequence generator according to claim 7 in which said counter is arranged to provide a count whose maximum magnitude is at least one unit greater than the maximum magnitude of the count nominally provided by the counter units alone one said switch means whereby the count to which each said counter unit is to count may be selected by setting said switch means.

10. A pseudorandom sequence generator according to claim 9 in which said switch means are continuously adjustable over the range of the selected count.

11. A pseudorandom sequence generator according to claim 5 in which said counter includes a plurality of counter units connected in series each counter unit being connected to at least one said switch means whereby the count to which each said counter unit is to count may be selected by setting said switch means.

12. A pseudorandom sequence generator according to claim 5 which includes means for setting said generator to a selected state when a new string is initiated whereby the initial digits in each said string form a usable number sequence.

13. Apparatus for generating a pseudorandom sequence of selectable cycle length, comprising
   A. a pseudorandom sequence generator connected to provide as output a sequence of digits, one at a time;
   B. a counter connected to count to a selected number corresponding to the number of digits which are to comprise a given sequence;
   C. means for setting the counter to count to said selected number; and
   D. means responsive to the count in said counter for resetting said generator and said counter when said counter has counted through the selected count.

14. Apparatus according to claim 13 which include means for selecting an initial sequence to which said generator is to be reset.

15. Apparatus according to claim 14 in which the means for setting said counter comprises a plurality of settable switches, each of which are manipulable to set the count to any one of a plurality of counts.

16. Apparatus according to claim 13 in which
   A. said counter loads the selected number in "R"s complement form and generates said count by successively passing through the states R–N to R, where R is the highest counting state of said counter; and
   B. the means responsive to the count in the counter
      1. generates a first control signal when the counter is in the R–M counting state, where $O \leq M<R$; and 2. generates a second control signal derived from said first control signal when the counter is in the R counting state, said second control signal resetting said generator and said counter.

* * * * *